US011929535B2

(12) United States Patent
Ting

(10) Patent No.: US 11,929,535 B2
(45) Date of Patent: Mar. 12, 2024

(54) PHASE SHIFTER AND PHASED ARRAY ANTENNA

(71) Applicants: Beijing BOE Sensor Technology Co., Ltd., Beijing (CN); BOE TECHNOLOGY GROUP CO., LTD., Beijing (CN)

(72) Inventor: Tienlun Ting, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 399 days.

(21) Appl. No.: 17/437,517

(22) PCT Filed: Nov. 23, 2020

(86) PCT No.: PCT/CN2020/130871
§ 371 (c)(1),
(2) Date: Sep. 9, 2021

(87) PCT Pub. No.: WO2021/104202
PCT Pub. Date: Jun. 3, 2021

(65) Prior Publication Data
US 2022/0149498 A1 May 12, 2022

(30) Foreign Application Priority Data
Nov. 29, 2019 (CN) ......................... 201911207745.4

(51) Int. Cl.
*H01P 1/18* (2006.01)
*H01Q 3/36* (2006.01)

(52) U.S. Cl.
CPC .................................... *H01P 1/18* (2013.01); *H01Q 3/36* (2013.01)

(58) Field of Classification Search
CPC . H01P 1/18; H01P 1/185; H01P 1/184; H01Q 3/36; H01Q 21/00; H01Q 21/06;
(Continued)

(56) References Cited

U.S. PATENT DOCUMENTS

2004/0178959 A1 9/2004 Park
2010/0171674 A1 7/2010 Henderson
(Continued)

FOREIGN PATENT DOCUMENTS

CN 1531139 A 9/2004
CN 2657214 Y 11/2004
(Continued)

OTHER PUBLICATIONS

The First Office Action of priority application No. CN 201911207745.4 issued by the China Patent Office dated Nov. 2, 2020.
(Continued)

*Primary Examiner* — Timothy X Pham
(74) *Attorney, Agent, or Firm* — IP & T GROUP LLP

(57) ABSTRACT

A phase shifter includes a substrate, a signal transmission structure disposed on the substrate, and a phase adjustment structure disposed on the substrate. The phase adjustment structure includes a conductive structure, at least one semiconductor structure disposed between the signal transmission structure and the conductive structure, a first insulating layer disposed between the conductive structure and the at least one semiconductor structure, and at least one first bias voltage line electrically connected to the conductive structure. Orthogonal projections, on the substrate, of the signal transmission structure, the conductive structure and the at least one semiconductor structure overlap with one another. An orthogonal projection, on the substrate, of the first insulating layer is located at least in a region in which the orthogonal projections, on the substrate, of the conductive
(Continued)

structure and the at least one semiconductor structure overlap.

20 Claims, 5 Drawing Sheets

(58) Field of Classification Search
CPC ........ H01Q 21/0012; H01Q 3/44; H01Q 1/38; H01Q 13/08; H01Q 13/20; H01Q 13/22; H01Q 15/14; H01Q 21/0037; H01Q 21/064; H01Q 21/065; H01Q 23/00; H01Q 3/34; H01Q 9/0457
See application file for complete search history.

(56) References Cited

U.S. PATENT DOCUMENTS

| | | | | |
|---|---|---|---|---|
| 2015/0380789 | A1* | 12/2015 | Jakoby | H01P 1/184 343/905 |
| 2020/0119445 | A1 | 4/2020 | Misaki | |
| 2020/0127012 | A1 | 4/2020 | Misaki | |
| 2021/0265713 | A1 | 8/2021 | Fang et al. | |
| 2021/0286204 | A1* | 9/2021 | Hoffmann | G02F 1/133526 |

FOREIGN PATENT DOCUMENTS

| | | | |
|---|---|---|---|
| CN | 110137636 | A | 8/2019 |
| CN | 110462841 | A | 11/2019 |
| CN | 110462842 | A | 11/2019 |
| CN | 110943299 | A | 3/2020 |

OTHER PUBLICATIONS

Supplementary search of the Chinese Application CN 201911207745.4.

Chou J S et al., Application of liquid phase deposited silicon dioxide to Metal-Oxide-Semiconductor Capacitor and Amorphous Silicon Thin-Film Transistor, Apr. 1996, pp. 599-604, vol. 43, No. 4, IEEE Transactions on Electron Devices.

Panchore M et al., Compact Behavioral Modeling and Time Dependent Performance Degradation Analysis of Junction and Doping Free Transistors, Jan. 26, 2017, 2016 IEEE International Symposium on Nanoelectronic and Information Systems (iNIS).

Song P et al., Wideband mm-Wave Phase Shifters Based on Constant-Impedance Tunable Transmission Lines, Aug. 11, 2016, 2016 IEEE MTT-S International Microwave Symposium (IMS).

* cited by examiner

PHASE SHIFTER AND PHASED ARRAY ANTENNA

CROSS-REFERENCE TO RELATED APPLICATIONS

This application is a national phase entry under 35 USC 371 of International Patent Application No. PCT/CN2020/130871, filed on Nov. 23, 2020, which claims priority to Chinese Patent Application No. 201911207745.4, filed on Nov. 29, 2019, which are incorporated herein by reference in their entirety.

TECHNICAL FIELD

The present disclosure relates to the field of communication technologies, and in particular, to a phase shifter and a phased array antenna.

BACKGROUND

Capable of changing a phase of electromagnetic wave signals, phase shifters are widely used in radar, satellite communications, mobile communications and other fields. Phase shifter is an important component of a phased array antenna, because it is used to control the phase of signals in an antenna array and can make a radiation beam perform electrical scanning. An ideal phase shifter should have low consumption, and should have substantially the same consumption in different phase states. In addition, an ideal phase shifter should also meet the requirements of having a fast phase shifting speed and requiring a low control power.

SUMMARY

In one aspect, a phase shifter is provided. The phase shifter includes: a substrate, a signal transmission structure disposed on the substrate, and a phase adjustment structure disposed on the substrate. The phase adjustment structure includes a conductive structure, at least one semiconductor structure, a first insulating layer, and at least one first bias voltage line. The at least one semiconductor structure is disposed between the signal transmission structure and the conductive structure; orthogonal projections, on the substrate, of the signal transmission structure, the conductive structure, and the at least one semiconductor structure respectively overlap with one another. The first insulating layer is disposed between the conductive structure and the at least one semiconductor structure; an orthogonal projection, on the substrate, of the first insulating layer is located at least in a region in which the orthogonal projections, on the substrate, of the conductive structure and the at least one semiconductor structure overlap. The at least one first bias voltage line is electrically connected to the conductive structure.

In some embodiments, the signal transmission structure includes a first ground electrode and a first signal line, and the first ground electrode and the first signal line are respectively disposed on two opposite sides of the substrate in a thickness direction thereof. Each semiconductor structure is electrically connected to the first signal line. An orthogonal projection, on the substrate, of each semiconductor structure overlaps with an orthogonal projection, on the substrate, of the first signal line.

In some embodiments, the phase shifter further includes a second bias voltage line, and the second bias voltage line is electrically connected to the first signal line.

In some embodiments, the conductive structure includes at least one first conductive sub-structure, and an orthogonal projection, on the substrate, of each first conductive sub-structure overlaps with an orthogonal projection, on the substrate, of the first signal line. The at least one first conductive sub-structure is configured to be in one-to-one correspondence with the at least one semiconductor structure.

In some embodiments, the first signal line includes a main structure and at least one branch structure. The at least one branch structure is electrically connected to the main structure, and a direction in which an orthogonal projection, on the substrate, of each branch structure extends intersects a direction in which an orthogonal projection, on the substrate, of the main structure extends. The at least one branch structure is configured to be in one-to-one correspondence with the at least one first conductive sub-structure, and the orthogonal projection, on the substrate, of each branch structure overlaps with an orthogonal projection, on the substrate, of a corresponding first conductive sub-structure.

In some embodiments, the conductive structure further includes at least one second conductive sub-structure. Orthogonal projection(s), on the substrate, of the at least one second conductive sub-structure do not overlap with the orthogonal projection, on the substrate, of the first signal line. Each second conductive sub-structure is electrically connected to at least one first conductive sub-structure.

In some embodiments, the conductive structure includes a plurality of first conductive sub-structures. The at least one second conductive sub-structure includes a plurality of second conductive sub-structures. Each second conductive sub-structure is electrically connected to at least one of the plurality of first conductive sub-structures, and different second conductive sub-structures are electrically connected to different first conductive sub-structures.

In some embodiments, not all second conductive sub-structures are connected to a same number of first conductive sub-structures.

In some embodiments, the at least one first bias voltage line is configured to be in one-to-one correspondence with the at least one second conductive sub-structure, and each first bias voltage line is electrically connected to a corresponding second conductive sub-structure.

In some embodiments, the first signal line includes a plurality of signal line segment structures spaced apart. Orthogonal projections, on the substrate, of the plurality of signal line segment structures do not overlap with one another, and orthogonal projections, on a plane perpendicular to a direction in which the first signal line extends, of the plurality of signal line segment structures all overlap with one another. An orthogonal projection, on the substrate, of an end, opposite to an adjacent signal line segment structure, of each signal line segment structure overlaps with an orthogonal projection, on the substrate, of one corresponding first conductive sub-structure.

In some embodiments, the conductive structure further includes at least one third conductive sub-structure. Orthogonal projection(s), on the substrate, of the at least one third conductive sub-structure do not overlap with the orthogonal projections, on the substrate, of the plurality of signal line segment structures. Each third conductive sub-structure is electrically connected to two adjacent first conductive sub-structures corresponding to opposite ends of two adjacent signal line segment structures.

In some embodiments, the phase shifter further includes a plurality of third bias voltage lines. The plurality of third bias voltage lines are configured to be in one-to-one correspondence with the plurality of signal line segment structures, and each third bias voltage line is electrically connected to a corresponding signal line segment structure. The at least one first bias voltage line is configured to be in one-to-one correspondence with the at least one third conductive sub-structure, and each first bias voltage line is electrically connected to a corresponding third conductive sub-structure.

In some embodiments, the signal transmission structure includes a second signal line, and a second ground electrode and a third ground electrode disposed at two opposite sides of the second signal line in a width direction thereof. The second signal line, the second ground electrode, and the third ground electrode are located on a same side of the substrate. Each semiconductor structure is electrically connected to the second signal line. An orthogonal projection, on the substrate, of the semiconductor structure overlaps with an orthogonal projection, on the substrate, of the second signal line, and the orthogonal projection, on the substrate, of the semiconductor structure does not overlap with orthogonal projections, on the substrate, of the second ground electrode and the third ground electrode.

In some embodiments, the conductive structure includes at least one fourth conductive sub-structure, and an orthogonal projection, on the substrate, of each fourth conductive sub-structure overlaps with the orthogonal projection, on the substrate, of the second signal line. The at least one fourth conductive sub-structure is configured to be in one-to-one correspondence with the at least one semiconductor structure.

In some embodiments, the phase shifter further includes a fourth bias voltage line, and the fourth bias voltage line is electrically connected to the second signal line.

In some embodiments, the at least one first bias voltage line is configured to be in one-to-one correspondence with the at least one fourth conductive sub-structure, and each first bias voltage line is electrically connected to a corresponding fourth conductive sub-structure.

In some embodiments, each fourth conductive sub-structure is electrically connected to the second ground electrode and the third ground electrode. A first bias voltage line is configured to be electrically connected to the second ground electrode or the third ground electrode.

In some embodiments, the second ground electrode and the third ground electrode are disposed on a surface, away from the second signal line, of the first insulating layer. The second signal line is disposed between the first insulating layer and the substrate.

In some embodiments, the at least one semiconductor structure includes a PIN junction or a PN junction.

In another aspect, a phased array antenna is provided. The phased array antenna includes the phase shifter as described in any of the above embodiments.

BRIEF DESCRIPTION OF THE DRAWINGS

In order to explain technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1A:
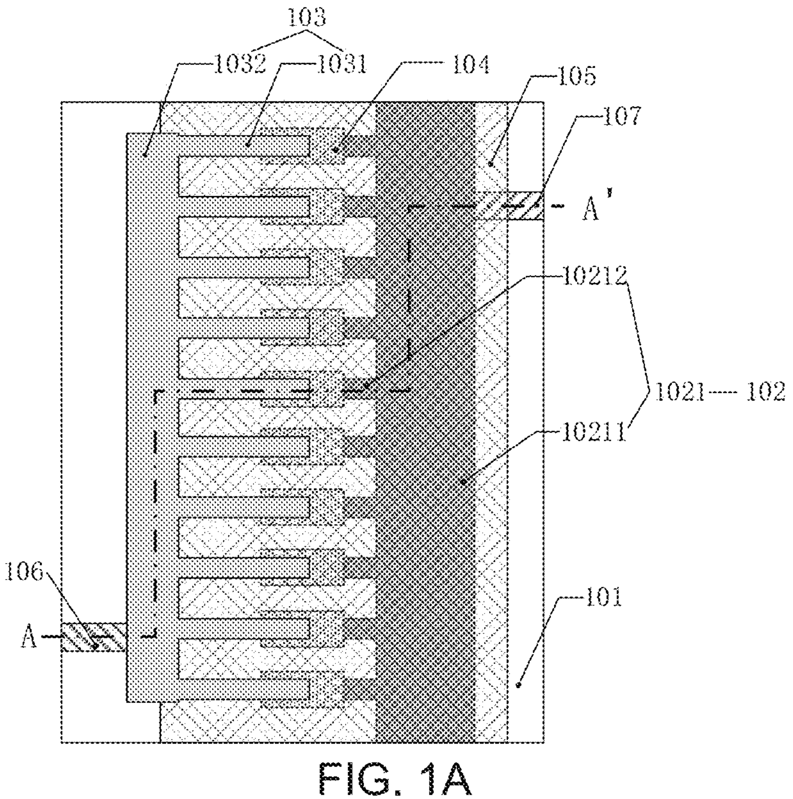
FIG. 1A is a plan view of a phase shifter according to some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained based on the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the term "connected" and derivatives thereof may be used. For example, the term "connected" may be used when describing some embodiments to indicate that two or more components are in direct physical contact or electrical contact with each other. However, the term "connected" may also mean that two or more components are not in direct contact with each other but still cooperate or interact with each other. The embodiments disclosed herein are not necessarily limited to the content herein.

The use of the phrase "configured to" herein indicates an open and inclusive expression, which does not exclude devices that are configured to perform additional tasks or steps.

In addition, the use of the phrase "based on" indicates openness and inclusiveness, since a process, step, calculation or other action that is "based on" one or more of the stated conditions or values may be based on additional conditions or values exceeding those stated in practice.

Terms such as "about" or "approximately" as used herein includes a stated value and an average value within an acceptable range of deviation of a particular value. The acceptable range of deviation is determined by a person of ordinary skill in the art in view of the measurement in question and errors associated with the measurement of a particular quantity (i.e., limitations of the measurement system).

Exemplary embodiments are described herein with reference to sectional views and/or plan views as idealized exemplary drawings. In the accompanying drawings, a size of each structure is enlarged for clarity. In addition, the exemplary embodiments should not be construed as being limited to a shape of each structure shown herein, but as including shape deviations due to, for example, manufacturing. Regions shown in the accompanying drawings are schematic in nature, and are not intended to limit the scope of the exemplary embodiments.

Figure 1B:
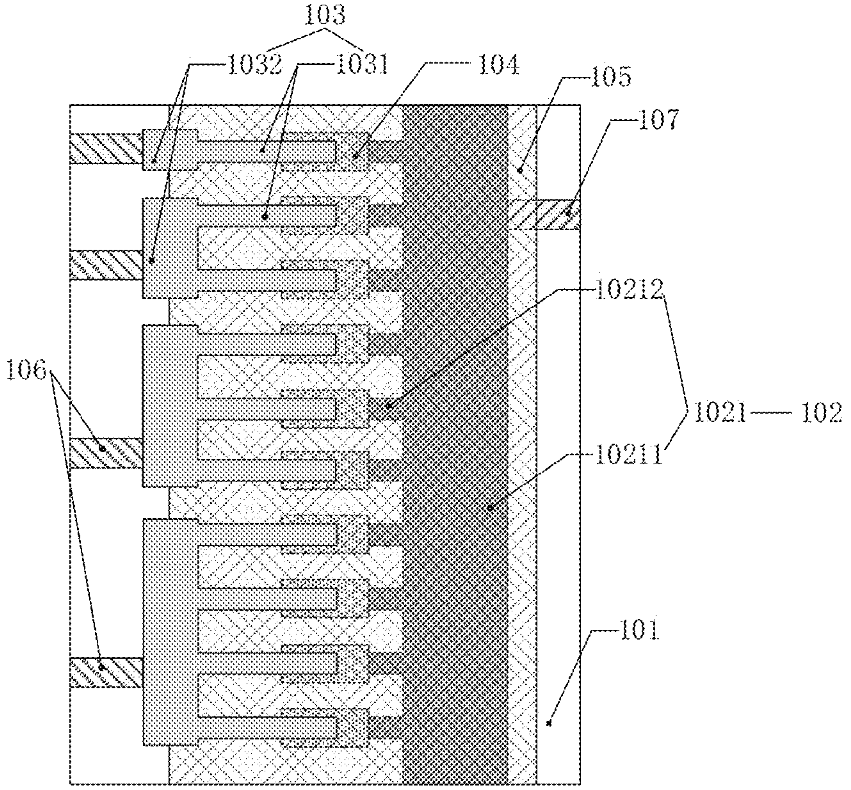
FIG. 1B is a plan view of another phase shifter in accordance with some embodiments of the present disclosure.
Figure 2A:
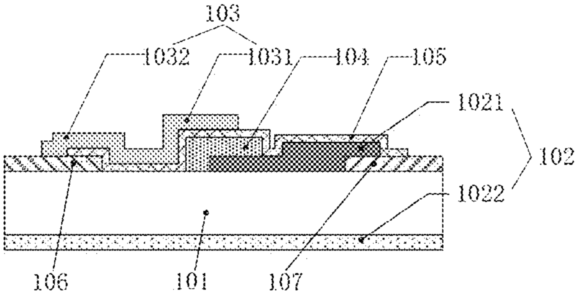
FIG. 2A is a partial sectional view taken along the line AA in FIG. 1A.
Figure 2B:
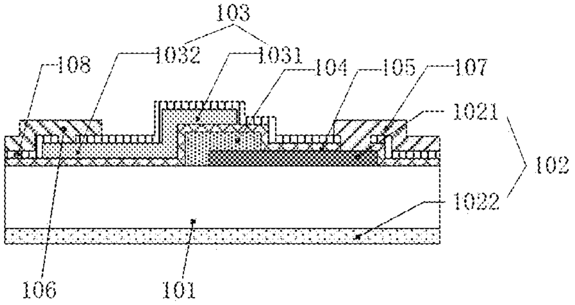
FIG. 2B is another partial sectional view taken along the line AA' in FIG. 1A.

FIGS. 1A, 1B, 2A, and 2B show structures of phase shifters according to some embodiments of the present disclosure. FIG. 1A is a plan view of a phase shifter; FIG. 1B is a plan view of another phase shifter FIG. 2A is a partial sectional view of the phase shifter in FIG. 1A taken along line AA; and FIG. 2B is another partial sectional view of the phase shifter in FIG. 1A taken along line AA.

Some embodiments of the present disclosure provide a phase shifter. As shown in FIGS. 1A, 1B, 2A and 2B, the phase shifter includes a substrate 101, and a signal transmission structure 102 and a phase adjustment structure that are disposed on the substrate 101. The phase adjustment structure includes a conductive structure 103, at least one semiconductor structure 104, a first insulating layer 105 and at least one first bias voltage line 106.

The at least one semiconductor structure 104 is arranged between the signal transmission structure 102 and the conductive structure 103, and orthogonal projections, on the substrate 101, of the signal transmission structure 102, the conductive structure 103, and the at least one semiconductor structure 104 overlap with one another. The first insulating layer 105 is arranged between the conductive structure 103 and the at least one semiconductor structure 104, and an orthogonal projection, on the substrate 101, of the first insulating layer 105 is located at least in a region in which the orthogonal projections, on the substrate 101, of the conductive structure 103 and the at least one semiconductor structure 104 overlap. The at least one first bias voltage line 106 is electrically connected to the conductive structure 103, and the at least one first bias voltage line 106 is configured to provide a required voltage signal to the conductive structure 103. Each semiconductor structure 104 is configured to adjust a phase of signal (such as a microwave signal) transmitted by the signal transmission structure 102 according to voltages applied to the signal transmission structure 102 and the conductive structure 103.

In some embodiments, the semiconductor structure 104 is directly electrically connected to the signal transmission structure 102. That is, the semiconductor structure 104 is arranged on a surface of the signal transmission structure 102. In some other embodiments, the semiconductor structure 104 is electrically connected to the signal transmission structure 102 through a via hole.

In some embodiments, the at least one semiconductor structure 104 includes a plurality of semiconductor structures 104, and orthogonal projections, on the substrate 101, of the plurality of semiconductor structures 104 do not overlap with one another. An orthogonal projection, on the substrate 101, of each semiconductor structure 104 overlaps with orthogonal projections, on the substrate 101, of the signal transmission structure 102 and the conductive structure 103. The first insulating layer 105 includes a plurality of portions, and each portion is arranged between the conductive structure 103 and one semiconductor structure 104.

At a position of each semiconductor structure 104, the signal transmission structure 102, the semiconductor structure 104, the conductive structure 103, and a portion of the first insulating layer 105 located between the conductive structure 103 and the semiconductor structure 104 together form an equivalent capacitor based on the semiconductor structure 104. By changing a capacitance value of the equivalent capacitor, it may be possible to change a phase velocity of the microwave signal transmitted by the signal transmission structure 102. Since the capacitance value of the equivalent capacitor is related to a length of a depletion region inside the semiconductor structure 104, and the length of the depletion region in the semiconductor structure 104 is related to a distribution of charges inside the semiconductor structure 104, the capacitance value of the equivalent capacitor may be adjusted by adjusting the distribution of charges inside the semiconductor structure 104.

In the embodiments of the present disclosure, the length of the depletion region in the semiconductor structure 104 changes as the voltages applied to the signal transmission structure 102 and the conductive structure 103 change. When the length of the depletion region in the semiconductor structure 104 changes, the capacitance value of the equivalent capacitor changes. Therefore, the phase velocity of the microwave signal transmitted by the signal transmission structure 102 may be changed, and a phase of the microwave signal may be changed. A change in the voltages applied to the signal transmission structure 102 and the conductive structure 103 only involves a change in the length of the depletion region caused by a redistribution of charges inside the semiconductor structure 104, and a response speed of the phase shifter may reach an order of microseconds. Moreover, since a thickness of the semiconductor structure 104 is small, an equivalent distance between the signal transmission structure 102 and the conductive structure 103 along a thickness direction of the semiconductor structure 104 is small, resulting in a large capacitance value of the equivalent capacitor. Therefore, the phase shifter provided in the embodiments of the present disclosure has a fast response speed and a large degree of phase shift.

As for a specific structure of the semiconductor structure 104, the embodiments of the present disclosure does not limit the specific structure of the semiconductor structure 104, as long as an equivalent capacitor can be formed by the semiconductor structure together with the signal transmission structure 102 and the conductive structure 103, and a capacitance value of the equivalent capacitor can be adjusted by controlling the voltages applied to the signal transmission structure 102 and the conductive structure 103. In some embodiments, the semiconductor structure 104 may include a PIN junction. In some examples, the semiconductor structure 104 includes a P-type semiconductor layer, an N-type semiconductor layer, and an intrinsic semiconductor layer located between the P-type semiconductor layer and the N-type semiconductor layer, which are stacked along a thickness direction of the substrate 101. In some other embodiments, the semiconductor structure 104 includes a PN junction. In some examples, the semiconductor structure 104 includes a P-type semiconductor layer and an N-type semiconductor layer, which are stacked along the thickness direction of the substrate 101.

As for the semiconductor structure 104 including the PIN junction or the PN junction, under a premise that a voltage of a bias signal applied by the P-type semiconductor layer is lower than a voltage of a bias signal applied by the N-type semiconductor layer, a capacitance value of the equivalent capacitor may be changed by changing a difference between voltages of the two bias signals. With the phase shifter provided in the embodiments of the present disclosure, the capacitance value of the equivalent capacitor may be adjusted very quickly, which increases a speed of adjusting the phase the microwave signal transmitted by the signal transmission structure 102. Therefore, the response speed of the phase shifter provided in the embodiments of the present disclosure is very quick.

By providing the first insulating layer 105 between the conductive structure 103 and the semiconductor structure 104, it may be possible to avoid microwave signal loss during transmission caused by a direct electrical connection between the conductive structure 103 and the semiconductor structure 104. In some examples, the first insulating layer 105 is made of any suitable insulating material. For example, the material of the first insulating layer 105 includes at least one of silicon oxide, silicon nitride or silicon oxynitride.

The first bias voltage line 106 may be made of a conductive material. In some examples, the first bias voltage line 106 is made of a metallic material such as copper, silver, aluminum, gold, iron, etc. In some examples, the first bias voltage line 106 is made of a conductive compound material such as indium tin oxide (ITO), indium zinc oxide (IZO), etc.

In some embodiments, as shown in FIGS. 1A, 2A and 2B, the signal transmission structure 102 includes a first ground electrode 1022 and a first signal line 1021, and the first ground electrode 1022 and the first signal line 1021 are respectively arranged on two opposite sides of the substrate 101 in the thickness direction thereof. For example, the first ground electrode 1022 is arranged on a lower surface of the substrate 101, and the first signal line 1021 is arranged on a side, away from the first ground electrode 1022, of the substrate 101. Each semiconductor structure 104 is electrically connected to the first signal line 1021 (for example, each semiconductor structure 104 is directly electrically connected to the first signal line 1021), and an orthogonal projection, on the substrate 101, of each semiconductor structure 104 overlaps with an orthogonal projection, on the substrate 101, of the first signal line 1021. Based on this, the first signal line 1021, each semiconductor structure 104, the conductive structure 103, and the portion of the first insulating layer 105 located between the semiconductor structure 104 and the conductive structure 103 together form the equivalent capacitor described above.

In some examples, the first ground electrode 1022 and the first signal line 1021 may be formed on different sides of the substrate 101 through sputtering and etching process, respectively.

In some examples, the first ground electrode 1022 and the first signal line 1021 may be made of a metal material such as copper, silver, aluminum, gold, iron, and the like. The first ground electrode 1022 and the first signal line 1021 may be made of a same material or different materials.

In some embodiments, as shown in FIGS. 1A, 1B, 2A and 2B, the conductive structure 103 includes at least one first conductive sub-structure 1031, and an orthogonal projection, on the substrate 101, of each first conductive sub-structure 1031 overlaps with an orthogonal projection, on the substrate 101, of the first signal line 1021. The at least one first conductive sub-structure 1031 is configured to be in one-to-one correspondence with the at least one semiconductor structure 104.

In some examples, the at least one first conductive sub-structure 1031 includes a plurality of first conductive sub-structures 1031, and orthogonal projections, on the substrate 101, of the plurality of first conductive sub-structures 1031 do not overlap with one another. Thus, each first conductive sub-structure 1031, a semiconductor structure 104 corresponding to the first conductive sub-structure 1031, a portion of the first insulating layer 105 located between the first conductive sub-structure 1031 and the corresponding semiconductor structure 104, and the first signal line 1021 together form one equivalent capacitor. That is, the number of the equivalent capacitors included in the phase shifter is the same as the number of the semiconductor structures 104.

A shape of the first conductive sub-structure 1031 may be set according to actual needs, which is not limited in the embodiments of the present disclosure. In some examples, the plurality of first conductive sub-structures 1031 have the same shape. That is, any two first conductive sub-structures 1031 have the same shape. In some other examples, the plurality of first conductive sub-structures 1031 have different shapes. For example, among the plurality of first conductive sub-structures 1031, any two first conductive sub-structures 1031 have different shapes. For another example, the plurality of first conductive sub-structures 1031 include at least three first conductive sub-structures 1031; at least two first conductive sub-structures 1031 have the same shape, and the shapes of the at least two first conductive sub-structures 1031 are different from the shape(s) of the remaining first conductive sub-structure(s) 1031.

A distance, in a direction in which the first conductive sub-structures 1031 are arranged, between two adjacent first conductive sub-structures 1031 may be set according to actual needs, which is not limited in the embodiments of the present disclosure. In some examples, a distance between any two adjacent first conductive sub-structures 1031 in the plurality of first conductive sub-structures 1031 is the same. In some other examples, the distance between any two adjacent first conductive sub-structures 1031 in the plurality of first conductive sub-structures 1031 is different.

In some other examples, among all the gaps formed by every two adjacent first conductive sub-structures 1031 in the plurality of first conductive sub-structures 1031, at least two gaps have a same length, and at least two gaps have different lengths. Here, the length of the gap refers to the distance between two adjacent first conductive sub-structures 1031.

In some examples, the first conductive sub-structures 1031 may be made of a metal material such as copper, silver, aluminum, gold, iron, and the like.

According to a calculation formula of the capacitance value of parallel plate capacitor, the capacitance value of the equivalent capacitor may be expressed as:

$$C_1 = \frac{\varepsilon_0 \varepsilon_r S}{d}.$$

In the above formula, $C_1$ is the capacitance value of the equivalent capacitor, d is an equivalent distance of the equivalent capacitor, $\varepsilon_r$ is the relative dielectric constant, $\varepsilon_0$ is the vacuum dielectric constant, and S is an equivalent area of the equivalent capacitor. The equivalent distance is related to the thickness of the semiconductor structure 104 and a thickness of the first insulating layer 105. In some cases, the charges inside the semiconductor structure 104 is not evenly distributed, and thus the equivalent distance may be slightly smaller than a sum of the thicknesses of the semiconductor structure 104 and the first insulating layer 105. The equivalent area is an area of an overlapping region of the orthogonal projection, on the substrate 101, of the first conductive sub-structure 1031 and the orthogonal projection, on the substrate 101, of the first signal line 1021. It may be seen from the above formula that the capacitance value of the equivalent capacitor is directly proportional to the relative dielectric constant and inversely proportional to the equivalent distance.

As for other phase shifters, such as a liquid crystal phase shifter, the relative dielectric constant of the formed equivalent capacitor is generally 2.58 to 3.6, and a thickness of a liquid crystal cell (i.e., the equivalent distance of the equivalent capacitor) is greater than 5 microns. In the phase shifter according to the embodiments of the present disclosure, in a case where the semiconductor structure 104 includes a PIN junction or a PN junction, the relative dielectric constant of the equivalent capacitor may be 10 to 20, and the equivalent distance of the equivalent capacitor is about 0.1 microns to 2 microns. Therefore, in a case where no bias voltage is applied, in the phase shifter according to the embodiments of the present disclosure, the capacitance value of the equivalent capacitor is at least 10 times that of the equivalent capacitor in the liquid crystal phase shifter. Therefore, the phase shifter provided in the embodiments of the present disclosure may achieve a wider adjustment range of the equivalent capacitance. In addition, since the phase shifter according to the embodiments of the present disclosure adjusts the capacitance value of the equivalent capacitor by adjusting the distribution of charges in the semiconductor structure 104, the response speed of the phase shifter according to the embodiments of the present disclosure is faster than that of the liquid crystal phase shifter.

In some embodiments, as shown in FIGS. 1A and 1B, the first signal line 1021 includes a main structure 10211 and at least one branch structure 10212. The at least one branch structure 10212 is electrically connected to the main structure 10211, and a direction in which an orthogonal projection, on the substrate 101, of each branch structure 10212 extends intersects a direction in which an orthogonal projection, on the substrate 101, of the main structure 10211 extends. In some examples, the at least one branch structure 10212 is configured to be in one-to-one correspondence with the at least one first conductive sub-structure 1031, and the orthogonal projection, on the substrate 101, of each branch structure 10212 overlaps with an orthogonal projection, on the substrate 101, of the corresponding first conductive sub-structure 1031.

In some examples, the at least one branch structure 10212 includes a plurality of branch structures 10212, and orthogonal projections, on the substrate 101, of the plurality of branch structures 10212 do not overlap with one another. Thus, each first conductive sub-structure 1031, and the semiconductor structure 104 corresponding to the first conductive sub-structure 1031, the branch structure 10212 corresponding to the first conductive sub-structure 1031, and a portion of the first insulating layer 105 located between the first conductive sub-structure 1031 and the corresponding semiconductor structure 104 together form one equivalent capacitor.

A shape of the branch structure 10212 may be set according to actual needs, which is not limited in the embodiments of the present disclosure. In some examples, the plurality of branch structures 10212 have the same shape. That is, any two branch structures 10212 have the same shape. In some other examples, the plurality of branch structures 10212 have different shapes. For example, among the plurality of branch structures 10212, any two branch structures 10212 have different shapes. For another example, the plurality of branch structures 10212 include at least three branch structures 10212; at least two branch structures 10212 have the same shape, and the shapes of the at least two branch structures 10212 are different from shape(s) of the remaining branch structure(s) 10212.

A distance, in a direction in which the main structure 10211 extends, between two adjacent branch structures 10212 may be set according to actual needs, which is not limited in the embodiments of the present disclosure. In some examples, a distance between any two adjacent branch structures 10212 in the plurality of branch structures 10212 is the same. In some other examples, the distance between any two adjacent branch structures 10212 in the plurality of branch structures 10212 is different.

In some other examples, among all gaps formed by every two adjacent branch structures 10212 in the plurality of branch structures 10212, at least two gaps have a same length, and at least two gaps have different lengths. Here, the length of the gap refers to the distance between two adjacent branch structures 10212.

In some embodiments, as shown in FIGS. 1A and 1B, the conductive structure 103 further includes at least one second conductive sub-structure 1032. Each second conductive sub-structure 1032 is electrically connected to at least one first conductive sub-structure 1031. Orthogonal projection(s), on the substrate 101, of the at least one second conductive sub-structure 1032 do not overlap with the orthogonal projection, on the substrate 101, of the first signal line 1021.

In some embodiments, as shown in FIG. 1A, the conductive structure 103 includes a plurality of first conductive sub-structures 1031 and one second conductive sub-structure 1032, and the plurality of first conductive sub-structures 1031 are all electrically connected to the second conductive sub-structure 1032.

In some other embodiments, as shown in FIG. 1B, the conductive structure 103 includes a plurality of first conductive sub-structures 1031 and a plurality of second conductive sub-structures 1032. Each second conductive sub-structure 1032 is electrically connected to at least one of the plurality of first conductive sub-structures 1031, and different second conductive sub-structures 1032 are electrically connected to different first conductive sub-structures 1031. In some examples, not all second conductive sub-structures 1032 are connected to the same number of first conductive sub-structures 1031. For example, along a direction in which the main structure 10211 extends, the number of first conductive sub-structures 1031 connected to each second conductive sub-structure 1032 gradually increases or decreases. In some other examples, each second conductive sub-structure 1032 is connected to the same number of first conductive sub-structures 1031.

In some examples, the second conductive sub-structure 1032 may be made of a metal material such as copper, silver, aluminum, gold, iron, etc., which is not limited in the embodiments of the present disclosure. In some examples, the first conductive sub-structure 1031 and the second conductive sub-structure 1032 are made of the same material, thereby simplifying a manufacturing process thereof.

In some embodiments, the at least one first bias voltage line 106 is configured to be in one-to-one correspondence with the at least one second conductive sub-structure 1032, and each first bias voltage line 106 is configured to be electrically connected to the corresponding second conductive sub-structure 1032.

In some embodiments, as shown in FIGS. 1A, 1B, 2A and 2B, the phase shifter further includes a second bias voltage line 107. The second bias voltage line 107 is configured to be electrically connected to the first signal line 1021.

The second bias voltage line 107 may be made of a metal material such as copper, silver, aluminum, gold, iron, etc., or a conductive compound material such as ITO, IZO, etc., which is not limited in the embodiments of the present disclosure.

By using the first bias voltage line 106 and the second bias voltage line 107 to apply bias signals to the second conductive sub-structure 1032 and the first signal line 1021 respectively, it may be possible to control a potential difference between two sides of the semiconductor structure 104, change the distribution of charges inside the semiconductor structure 104, and thus change the capacitance value of the equivalent capacitor.

Since different bias signals may be applied to different second conductive sub-structures 1032 through different first bias voltage lines 106, different equivalent capacitors may be controlled separately. As a result, the magnitude of phase shift of the microwave signal may be different after passing through different equivalent capacitors. That is, each second conductive sub-structure 1032 adjusts the magnitude of phase shift of the microwave signal passing through the corresponding equivalent capacitor. In a case where the number of second conductive sub-structures 1032 is N, 2N phase shifts may be obtained. Therefore, according to the magnitude of phase shift to be adjusted, a corresponding second conductive sub-structure 1032 may be controlled to be provided with the bias signal, and there is no need to apply bias signals to all the second conductive sub-structures 1032. In this way, the phase shifter provided in the embodiments is convenient to control and has low power consumption.

In some embodiments, as shown in FIG. 2B, the phase shifter further includes a second insulating layer 108 disposed on a side, away from the substrate 101, of the conductive structure 103. The first bias voltage line 106 may be electrically connected to the second conductive sub-structure 1032 through a via hole penetrating through the second insulating layer 108. The second bias voltage line 107 may be electrically connected to the first signal line 1021 through a via hole penetrating through both the first insulating layer 105 and the second insulating layer 108. Since the first conductive sub-structure 1031 and the second conductive sub-structure 1032 are both made of a metal material, the second insulating layer 108 may prevent an oxidation of the first conductive sub-structure 1031 and the second conductive sub-structure 1032, and thus avoids the loss of the phase shifter caused by the oxidation of the metal material.

The second insulating layer 108 may be made of any suitable electrical insulating material. For example, the second insulating layer 108 may made of at least one of silicon oxide, silicon nitride, or silicon oxynitride.

Figure 3:
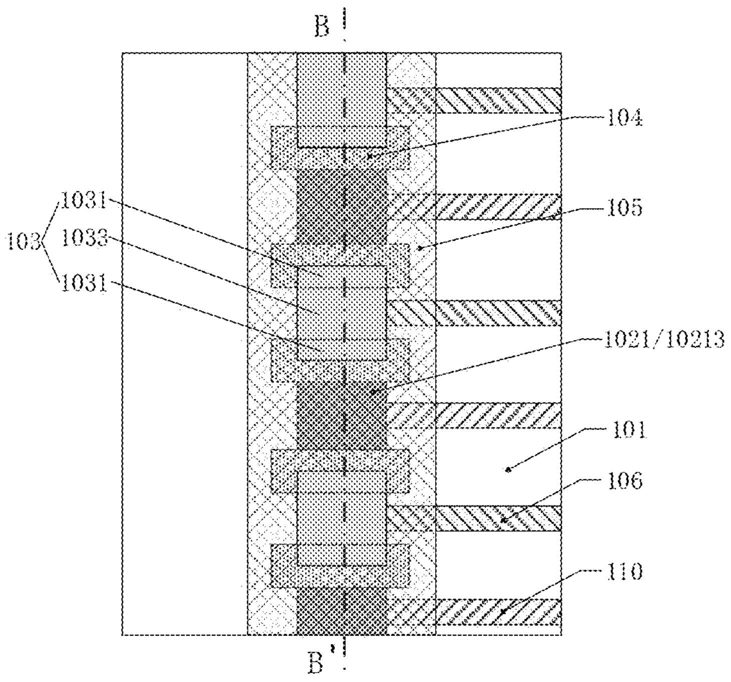
FIG. 3 is a plan view of yet another phase shifter in accordance with some embodiments of the present disclosure.
Figure 4:
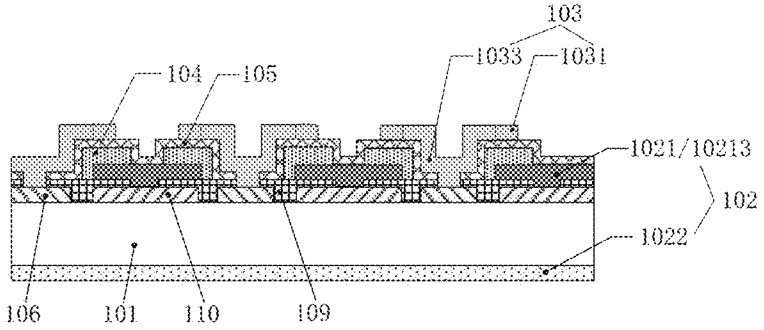
FIG. 4 is a partial sectional view taken along the line BB' in FIG. 3.

FIGS. 3 and 4 show a structure of a phase shifter according to some embodiments of the present disclosure. FIG. 3 is a plan view of the phase shifter, and FIG. 4 is a partial sectional view of the phase shifter taken along the line BB' in FIG. 3.

In some embodiments, as shown in FIGS. 3 and 4, the first signal line 1021 includes a plurality of signal line segment structures 10213 spaced apart. Orthogonal projections, on the substrate 101, of the plurality of signal line segment structures 10213 do not overlap with one another, and orthogonal projections, on a plane perpendicular to an extending direction of the first signal line 1021, of the plurality of signal line segment structures 10213 all overlap with one another. An orthogonal projection, on the substrate, of an end, opposite to an adjacent signal line segment structure 10213, of each signal line segment structure 10213 overlaps with an orthogonal projection, on the substrate, of one corresponding first conductive sub-structure 1031.

In some embodiments, as shown in FIGS. 3 and 4, the conductive structure 103 further includes at least one third conductive sub-structure 1033. Orthogonal projection(s), on the substrate 101, of the at least one third conductive sub-structure 1033 do not overlap with the orthogonal projections, on the substrate 101, of the plurality of signal line segment structures 10213. Each third conductive sub-structure 1033 is configured to be electrically connected to two adjacent first conductive sub-structures 1031 corresponding to opposite ends of the two adjacent signal line segment structures 10213. For example, each third conductive sub-structure 1033 is electrically connected to two adjacent first conductive sub-structures 1031 to form a one-piece structure.

Correspondingly, each first conductive sub-structure 1031 and a corresponding semiconductor structure 104, one end of the signal line segment structure 10213 corresponding to the first conductive sub-structure 1031, and a portion of the first insulating layer 105 located between the first conductive sub-structure 1031 and the corresponding semiconductor structure 104 together form one equivalent capacitor.

In some embodiments, the third conductive sub-structure 1033 may be made of a metal such as copper, silver, aluminum, gold, iron, etc., which is not limited in the embodiments of the present disclosure. In some examples, the first conductive sub-structure 1031 and the third conductive sub-structure 1033 are made of a same material, and are fabricated in a same layer by using a same process, so as to reduce the difficulty of the manufacturing process.

In some embodiments, as shown in FIG. 3, the phase shifter further includes a plurality of third bias voltage lines 110. The plurality of third bias voltage lines 110 are configured to be in one-to-one correspondence with the plurality of signal line segment structures 10213, and each third bias voltage line 110 is electrically connected to the corresponding signal line segment structure 10213.

In some embodiments, as shown in FIG. 3, the at least one first bias voltage line 106 is configured to be in one-to-one correspondence with the at least one third conductive sub-structure 1033, and each first bias voltage line 106 is electrically connected to the corresponding third conductive sub-structure 1033.

In a case where there are a plurality of third conductive sub-structures 1033, since different third conductive sub-structures 1033 may transmit different bias signals applied by different first bias voltage lines 106 to the first conductive sub-structures 1031 electrically connected to them, and different signal line segment structures 10213 may be provided with different bias signals through different third bias voltage lines 110, different equivalent capacitors may be separately controlled, and thus the magnitude of phase shift of the microwave signal may be different after passing through different equivalent capacitors. Therefore, the bias signal applied to the corresponding equivalent capacitor may be controlled according to the magnitude of the phase shift to be adjusted. In this way, there is no need to apply bias signals to all the third conductive sub-structures 1033, and there is no need to apply bias signals to all the signal line segment structures 10213. As such, the phase shifter provided in the embodiments of the present disclosure is even more convenient to control and has even lower power consumption.

The third bias voltage line 110 may be made of a metal material such as copper, silver, aluminum, gold, iron, etc., or a conductive compound material such as ITO, IZO, etc., which is not limited in the embodiments of the present disclosure.

In some embodiments, as shown in FIG. 4, the phase shifter further includes a planarization layer 109 disposed between the substrate 101 and the first signal line 1021. In some examples, the signal line segment structure 10213 is disposed on a side, away from the substrate 101, of the planarization layer 109.

In some examples, the first bias voltage line 106 and the third bias voltage line 110 are arranged between the substrate 101 and the planarization layer 109. The signal line segment structure 10213 is electrically connected to the third bias voltage line 110 through a via hole penetrating through the planarization layer 109. The third conductive sub-structure 1033 is electrically connected to the first bias voltage line 106 through a via hole penetrating through both the planarization layer 109 and the first insulating layer 105.

By providing the planarization layer 109, it may be possible to reduce a step difference caused by the first bias voltage line 106 and the third bias voltage line 110, so as to reduce a risk of breakage during film formation of other structures caused by a high step difference and improve a yield of the phase shifter.

In some embodiments, the planarization layer 109 may be made of an inorganic material such as silicon oxide, silicon nitride, aluminum oxide, or silicon oxynitride, which is not limited in the embodiments of the present disclosure.

In some embodiments, an orthogonal projection, on the substrate 101, of the first bias voltage line 106 does not overlap with an orthogonal projection, on the substrate 101, of the third bias voltage line 110.

Figure 5:
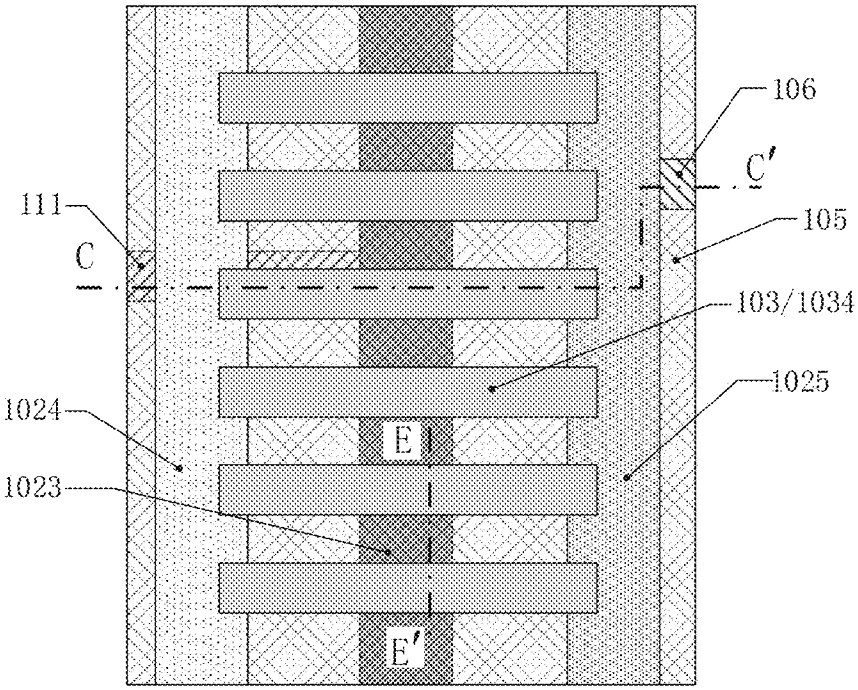
FIG. 5 is a plan view of yet another phase shifter in accordance with some embodiments of the present disclosure.
Figure 6:
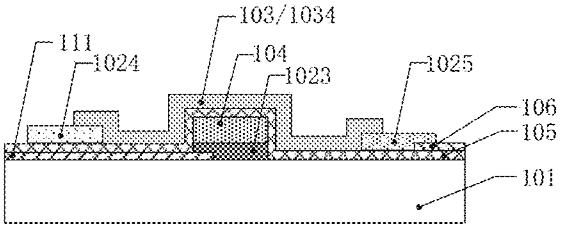
FIG. 6 is a partial sectional view taken along the line CC' in FIG. 5.
Figure 7:
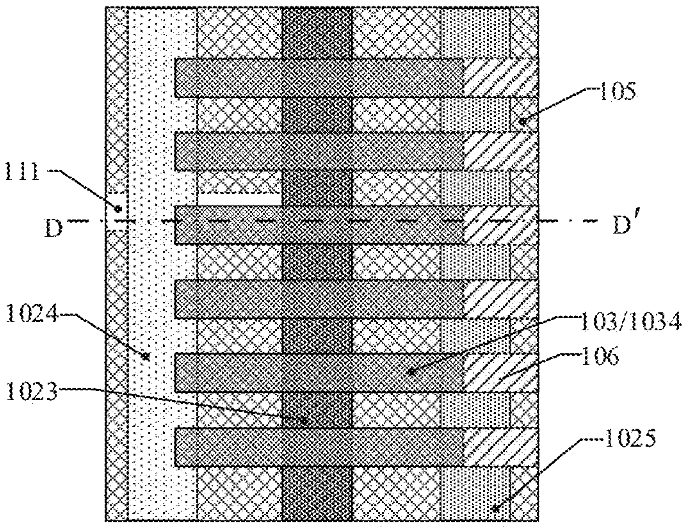
FIG. 7 is a plan view of yet another phase shifter in accordance with some embodiments of the present disclosure.
Figure 8:
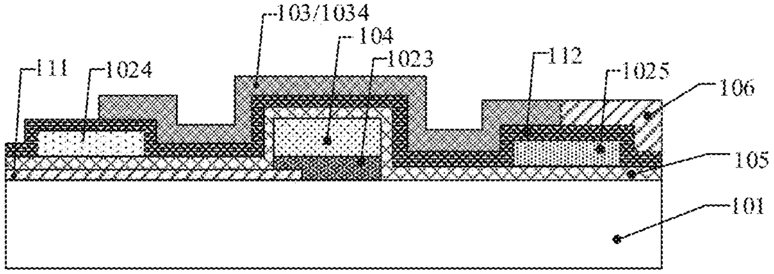
FIG. 8 is a partial sectional view taken along the line DD' in FIG. 7.

FIGS. 5 and 6 show a structure of a phase shifter according to some embodiments of the present disclosure. FIG. 5 is a plan view of the phase shifter, and FIG. 6 is a partial sectional view of the phase shifter taken along the line CC' in FIG. 5. FIGS. 7 and 8 show a structure of another phase shifter according to some embodiments of the present disclosure. FIG. 7 is a plan view of the phase shifter, and FIG. 8 is a partial sectional view of the phase shifter taken along the line DD' in FIG. 7.

As shown in FIGS. 5 to 8, the signal transmission structure 102 includes a second signal line 1023, and a second ground electrode 1024 and a third ground electrode 1025 disposed at two opposite sides of the second signal line 1023 in a width direction thereof. The second signal line 1023, the second ground electrode 1024, and the third ground electrode 1025 are located on a same side of the substrate 101. Each semiconductor structure 104 is electrically connected to the second signal line 1023. An orthogonal projection, on the substrate 101, of each semiconductor structure 104 overlaps with an orthogonal projection, on the substrate 101, of the second signal line 1023, and the orthogonal projection, on the substrate 101, of each semiconductor structure 104 does not overlap with orthogonal projections, on the substrate 101, of the second ground electrode 1024 and the third ground electrode 1025.

In some examples, as shown in FIGS. 6 and 8, the second ground electrode 1024 and the third ground electrode 1025 are disposed on a surface, away from the second signal line 1023, of the first insulating layer 105, and the second signal line 1023 is arranged between the first insulating layer 105 and the substrate 101. For example, the semiconductor structure 104 is disposed on a surface, proximate to the first insulating layer 105, of the second signal line 1023.

In some embodiments, the second signal line 1023, the second ground electrode 1024, and the third ground electrode 1025 may be made of a metal material such as copper, silver, aluminum, gold, and iron, etc. In some examples, in order to simplify the manufacturing process, it is arranged that the second signal line 1023, the second ground electrode 1024, and the third ground electrode 1025 are made of a same metal material.

Figure 9:
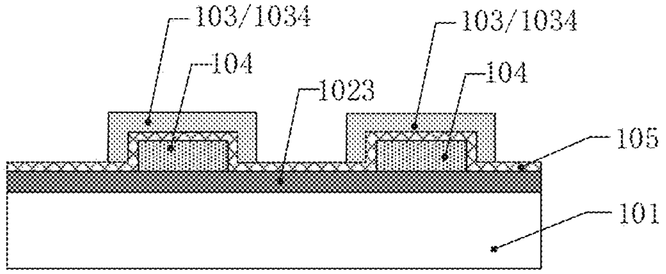
FIG. 9 is a partial sectional view taken along the line EE' in FIG. 5.

In some embodiments, as shown in FIGS. 5 and 7, the conductive structure 103 includes at least one fourth conductive sub-structure 1034. An orthogonal projection, on the substrate 101, of each fourth conductive sub-structure 1034 overlaps with the orthogonal projection, on the substrate 101, of the second signal line 1023. In some examples, as shown in FIG. 9, the at least one fourth conductive sub-structure 1034 is configured to be in one-to-one correspondence with the at least one semiconductor structure 104. For example, the at least one fourth conductive sub-structure 1034 includes a plurality of fourth conductive sub-structures 1034, and the at least one semiconductor structure 104 includes a plurality of semiconductor structures 104.

Correspondingly, each fourth conductive sub-structure 1034 and a corresponding semiconductor structure 104, a portion of the first insulating layer 105 located between the fourth conductive sub-structure 1034 and the corresponding semiconductor structure 104, and the second signal line 1023 together form one equivalent capacitor. That is, the number of the equivalent capacitors included in the phase shifter is the same as the number of the semiconductor structures 104.

A shape of the fourth conductive sub-structure 1034 may be set according to actual needs, which is not limited in the embodiments of the present disclosure. In some embodiments, the plurality of fourth conductive sub-structures 1034 have the same shape. That is, any two fourth conductive sub-structures 1034 in the plurality of fourth conductive sub-structures 1034 have the same shape. In some other embodiments, the plurality of fourth conductive sub-structures 1034 have different shapes. For example, any two fourth conductive sub-structures 1034 in the plurality of fourth conductive sub-structures 1034 have different shapes. For another example, the plurality of fourth conductive sub-structures 1034 includes at least three fourth conductive sub-structures 1034, at least two fourth conductive sub-structures 1034 have the same shape, and the shapes of the at least two fourth conductive sub-structures 1034 are different from shape(s) of the remaining fourth conductive sub-structure(s) 1034.

The plurality of fourth conductive sub-structures 1034 is spaced apart in an extending direction of the second signal line 1023. A distance between two adjacent fourth conductive sub-structures 1034 may be set according to actual needs, which is not limited in the embodiments of the present disclosure. In some embodiments, a distance between any two adjacent fourth conductive sub-structures 1034 in the plurality of fourth conductive sub-structures 1034 is the same. In some other embodiments, the distance between any two adjacent fourth conductive sub-structures 1034 in the plurality of fourth conductive sub-structures 1034 is different.

In some other examples, among all gaps formed by every two adjacent fourth conductive sub-structures 1034 in the plurality of fourth conductive sub-structures 1034, at least two gaps have a same length, and at least two gaps have different lengths. Here, the length of the gap refers to the distance between two adjacent fourth conductive sub-structures 1034.

In some embodiments, the fourth conductive sub-structure 1034 may be made of a metal such as copper, silver, aluminum, gold, iron, etc., which are not limited in the embodiments of the present disclosure.

In some embodiments, as shown in FIGS. 7 and 8, the at least one first bias voltage line 106 is configured to be in one-to-one correspondence with the at least one fourth conductive sub-structure 1034, and each first bias voltage line 106 is electrically connected to the corresponding fourth conductive sub-structure 1034. In some examples, the at least one first bias voltage line 106 includes a plurality of first bias voltage lines 106, and the at least one fourth conductive sub-structure 1034 includes a plurality of fourth conductive sub-structures 1034.

In the case where there are the plurality of fourth conductive sub-structures 1034, each fourth conductive sub-structure 1034 may be applied with a different bias signal, so that different equivalent capacitors may be controlled separately, and the magnitude of the phase shift of the microwave signal may be different after passing through different equivalent capacitors. Therefore, the bias signal applied to the corresponding equivalent capacitor may be controlled according to the magnitude of phase shift to be adjusted, and there is no need to apply bias signals to all the fourth conductive sub-structures 1034. As such, the phase shifter provided in the embodiments is convenient to control and has low power consumption.

In some examples, as shown in FIG. 8, the phase shifter further includes a third insulating layer 112. The third insulating layer 112 is disposed between the second ground electrode 1024 and the fourth conductive sub-structure 1034, and between the third ground electrode 1025 and the fourth conductive sub-structure 1034. Here, insulation is maintained between each fourth conductive sub-structure 1034 and the second ground electrode 1024, and between each fourth conductive sub-structure 1034 and the third ground electrode 1025.

In some examples, the first bias voltage line 106 and the fourth conductive sub-structure 1034 are arranged on a same side of the third insulating layer 112. For example, each first bias voltage line 106 is electrically connected to the corresponding fourth conductive sub-structure 1034 to form a one-piece structure.

In some embodiments, as shown in FIGS. 5 and 6, each fourth conductive sub-structure 1034 is configured to be electrically connected to the second ground electrode 1024 and the third ground electrode 1025. In some examples, the first bias voltage line 106 is configured to be electrically connected to the fourth conductive sub-structure 1034 in the conductive structure 103 through the second ground electrode 1024 or the third ground electrode 1025.

In some embodiments, as shown in FIGS. 5 to 8, the phase shifter further includes a fourth bias voltage line 111, and the fourth bias voltage line 111 is configured to be electrically connected to the second signal line 1023.

The fourth bias voltage line 111 may be made of a metal material such as copper, silver, aluminum, gold, iron, etc., or a conductive compound material such as ITO, IZO, etc., which is not limited in the embodiments of the present disclosure.

Based on the inventive concept of the foregoing embodiments, some embodiments of the present disclosure further provide a phased array antenna. The phased array antenna includes the phase shifter as described in any of the foregoing embodiments of the present disclosure. As for an implementation description of the phase shifter, reference may be made to a corresponding description in the above embodiments, and details will not be repeated here. It will be noted that, the number of phase shifters included in the phased array antenna is determined according to actual needs, and is not specifically limited in the embodiments of the present disclosure.

The following points need to be noted:

(1) in the drawings of the embodiments of the present disclosure, only the structures related to the embodiments of the present disclosure are illustrated, and reference may be made to common design with regard to other structures;

(2) in a case of no conflict, features in the same embodiment and different embodiments of the present disclosure can be combined with one another.

The foregoing descriptions are merely specific implementations of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A phase shifter, comprising:
- a substrate;
- a signal transmission structure disposed on the substrate; and
- a phase adjustment structure disposed on the substrate, wherein the phase adjustment structure includes:
  - a conductive structure;
  - at least one semiconductor structure disposed between the signal transmission structure and the conductive structure, orthogonal projections, on the substrate, of the signal transmission structure, the conductive structure, and the at least one semiconductor structure overlapping with one another;
  - a first insulating layer disposed between the conductive structure and the at least one semiconductor structure; an orthogonal projection, on the substrate, of the first insulating layer being located at least in a region in which the orthogonal projections, on the substrate, of the conductive structure and the at least one semiconductor structure overlap; and at least one first bias voltage line electrically connected to the conductive structure.

2. The phase shifter according to claim 1, wherein the signal transmission structure includes a first ground electrode and a first signal line, and the first ground electrode and the first signal line are respectively disposed on two opposite sides of the substrate in a thickness direction thereof, wherein each semiconductor structure is electrically connected to the first signal line; and an orthogonal projection, on the substrate, of each semiconductor structure overlaps with an orthogonal projection, on the substrate, of the first signal line.

3. The phase shifter according to claim 2, further comprising:

a second bias voltage line, the second bias voltage line being electrically connected to the first signal line.

4. The phase shifter according to claim 2, wherein the conductive structure includes at least one first conductive sub-structure, and an orthogonal projection, on the substrate, of each first conductive sub-structure overlaps with an orthogonal projection, on the substrate, of the first signal line; and the at least one first conductive sub-structure is configured to be in one-to-one correspondence with the at least one semiconductor structure.

5. The phase shifter according to claim 4, wherein the first signal line includes a main structure and at least one branch structure; the at least one branch structure is electrically connected to the main structure, and a direction in which an orthogonal projection, on the substrate, of each branch structure extends intersects a direction in which an orthogonal projection, on the substrate, of the main structure extends;

the at least one branch structure is configured to be in one-to-one correspondence with the at least one first conductive sub-structure, and the orthogonal projection, on the substrate, of each branch structure overlaps with an orthogonal projection, on the substrate, of a corresponding first conductive sub-structure.

6. The phase shifter according to claim 5, wherein the conductive structure further includes at least one second conductive sub-structure:

at least one orthogonal projection, on the substrate, of the at least one second conductive sub-structure do not overlap with the orthogonal projection, on the substrate, of the first signal line; and each second conductive sub-structure is electrically connected to at least one first conductive sub-structure.

7. The phase shifter according to claim 6, wherein the conductive structure includes a plurality of first conductive sub-structures;

the at least one second conductive sub-structure includes a plurality of second conductive sub-structures; each second conductive sub-structure is electrically connected to at least one of the plurality of first conductive sub-structures, and different second conductive sub-structures are electrically connected to different first conductive sub-structures.

8. The phase shifter according to claim 7, wherein not all second conductive sub-structures are connected to a same number of first conductive sub-structures.

9. The phase shifter according to claim 6, wherein the at least one first bias voltage line is configured to be in one-to-one correspondence with the at least one second conductive sub-structure, and each first bias voltage line is electrically connected to a corresponding second conductive sub-structure.

10. The phase shifter according to claim 4, wherein the first signal line includes a plurality of signal line segment structures spaced apart; orthogonal projections, on the substrate, of the plurality of signal line segment structures do not overlap with one another, and orthogonal projections, on a plane perpendicular to a direction in which the first signal line extends, of the plurality of signal line segment structures all overlap with one another;

an orthogonal projection, on the substrate, of an end, opposite to an adjacent signal line segment structure, of each signal line segment structure overlaps with an orthogonal projection, on the substrate, of one corresponding first conductive sub-structure.

11. The phase shifter according to claim 10, wherein the conductive structure further includes at least one third conductive sub-structure;

at least one orthogonal projection, on the substrate, of the at least one third conductive sub-structure do not overlap with the orthogonal projections, on the substrate, of the plurality of signal line segment structures; and each third conductive sub-structure is electrically connected to two adjacent first conductive sub-structures corresponding to opposite ends of two adjacent signal line segment structures.

12. The phase shifter according to claim 11, further comprising:

a plurality of third bias voltage lines, wherein the plurality of third bias voltage lines are configured to be in one-to-one correspondence with the plurality of signal line segment structures, and each third bias voltage line is electrically connected to a corresponding signal line segment structure;

the at least one first bias voltage line is configured to be in one-to-one correspondence with the at least one third conductive sub-structure, and each first bias voltage line is electrically connected to a corresponding third conductive sub-structure.

13. The phase shifter according to claim 1, wherein the signal transmission, structure includes a second signal line, and a second ground electrode and a third ground electrode disposed at two opposite sides of the second signal line in a width direction thereof; the second signal line, the second ground electrode and the third ground electrode are located on a same side of the substrate;

each semiconductor structure is electrically connected to the second signal line; an orthogonal projection, on the substrate, of the semiconductor structure overlaps with an orthogonal projection, on the substrate, of the second signal line, and the orthogonal projection, on the substrate, of the semiconductor structure does not overlap with orthogonal projections, on the substrate, of the second ground electrode and the third ground electrode.

14. The phase shifter according to claim 13, wherein the conductive structure includes at least one fourth conductive sub-structure, and an orthogonal projection, on the substrate, of each fourth conductive sub-structure overlaps with the orthogonal projection, on the substrate, of the second signal line, wherein the at least one fourth conductive sub-structure is configured to be in one-to-one correspondence with the at least one semiconductor structure.

15. The phase shifter according to claim 14, further comprising:

a fourth bias voltage line, the fourth bias voltage line being electrically connected to the second signal line.

16. The phase shifter according to claim 14, wherein the at least one first bias voltage line is configured to be in one-to-one correspondence with the at least one fourth conductive sub-structure, and each first bias voltage line is electrically connected to a corresponding fourth conductive sub-structure.

17. The phase shifter according to claim 14, wherein each fourth conductive sub-structure is electrically connected to the second ground electrode and the third ground electrode; and a first bias voltage line is configured to be electrically connected to the second ground electrode or the third ground electrode.

18. The phase shifter according to claim 13, wherein the second ground electrode and the third ground electrode are disposed on a surface, away from the second signal line, of the first insulating layer; and the second signal line is disposed between the first insulating layer and the substrate.

19. The phase shifter according to claim 1, wherein the at least one semiconductor structure includes a PIN junction or a PN junction.

20. A phased array antenna, comprising the phase shifter according to claim 1.

* * * * *